(12) United States Patent
Agrawal et al.

(10) Patent No.: US 7,544,155 B2
(45) Date of Patent: *Jun. 9, 2009

(54) GRAVITY BALANCED ORTHOSIS APPARATUS

(75) Inventors: Sunil K. Agrawal, Newark, DE (US); Abbas Fattah, Newark, DE (US); Sal Banala, Newark, DE (US)

(73) Assignee: University of Delaware, Newark, DE (US)

( * ) Notice: Subject to any disclaimer, the term of this patent is extended or adjusted under 35 U.S.C. 154(b) by 670 days.

This patent is subject to a terminal disclaimer.

(21) Appl. No.: 11/113,729

(22) Filed: Apr. 25, 2005

(65) Prior Publication Data

US 2006/0241539 A1   Oct. 26, 2006

(51) Int. Cl.
 *A61H 3/00* (2006.01)
 *A61H 5/00* (2006.01)
(52) U.S. Cl. .......................................... 482/69; 601/34
(58) Field of Classification Search .................. 602/26, 602/23; 482/51, 69, 54, 66–68; 297/DIG. 10; 434/255; 601/23, 33–35
See application file for complete search history.

(56) References Cited

U.S. PATENT DOCUMENTS

| 2,210,269 | A | * | 8/1940 | Taylor ........................ 601/33 |
| 5,020,790 | A | * | 6/1991 | Beard et al. .................... 482/4 |
| 5,333,604 | A | * | 8/1994 | Green et al. .................. 601/33 |
| 6,213,554 | B1 | * | 4/2001 | Marcoux et al. ............. 297/330 |
| 6,821,233 | B1 | * | 11/2004 | Colombo et al. .............. 482/54 |
| 7,247,128 | B2 | * | 7/2007 | Oga ............................. 482/51 |
| 2003/0023195 | A1 | | 1/2003 | Rahman et al. |
| 2005/0043661 | A1 | | 2/2005 | Nashner |

FOREIGN PATENT DOCUMENTS

| GB | 1 406 420 A | 9/1975 |
| WO | WO 94/09727 A | 5/1994 |
| WO | WO 00/28927 A | 5/2000 |

OTHER PUBLICATIONS

Sunil K. Agrawal, Abbas Fattah, Sai Banala; "Design and Prototype of a Gravity-Balanced Leg Orthosis"; International Journal of HWRS; vol. 4, No. 3; Sep. 2003; pp. 13-16.

(Continued)

*Primary Examiner*—Fenn C Mathew
(74) *Attorney, Agent, or Firm*—RatnerPrestia

(57) ABSTRACT

Passive gravity balancing orthosis apparatus for assisting and training patients suffering from muscle weakness by relieving the patients afflicted member of its weight using a plurality of articulated supporting members. Relief is obtained by identifying and fixing the center of mass of the combined articulated equipment members and supported weight of the patient's member in space using a defined parallelogram mechanism and once so identified making the total potential energy for any configuration of the articulated members of the system constant. At least one zero free length spring is used to connect the center of mass to a support outside the articulated members. Additional springs connect the center of mass to the articulated members.

18 Claims, 5 Drawing Sheets

OTHER PUBLICATIONS

Sunil K. Agrawal, Abbas Fattah; "Design of an Orthotic Device for Full or Partial Gravity-Balancing of a Human Upper Arm During Motion"; Proceedings of the 2003 IEEE/RSJ International Conference on Intelligent Robots and Systems; Oct. 2003; pp. 2841-2846.

Sai K. Banala, Sunil K. Agrawal, Abbas Fattah, Katherine Rudolph, John P. Scholz; A Gravity Balancing Leg Orthosis for Robotic Rehabilitation; Proceedings of the 2004 IEEE International Conference on Robotics & Automation; Apr. 2004; pp. 2474-2479.

Abbas Fattah, et al.; "Design of a Passive Gravity-Balanced Assistive Device for Sit-to-Stand Tasks"; Journal of Mechanical Design, Sep. 2006.

Abbas Fattah, Ph.D. et al.; "Design of a Gravity-Balanced Assistive Device for Sit-to-Stand Tasks" ASME Journal; Proceedings of DETC '04 ASME 2004 Design Engineering Technical Conferences Sep. 28-Oct. 2, 2004; Salt Lake City, Utah, USA; pp. 1-7.

Roman Kamnik, et al.; "Robot Assistive Device for Augmenting Standing-Up Capabilities in Impaired People"; journal; Oct. 2003; pp. 3606-3611; Proceedings of the 2003 IEEE/RSJ International Conference on Intelligent Robots and Systems, Las Vegas, NV; USA.

Michael Peshkin, et al.; "KineAssist: A Robotic Overground Gait and Balance Training Device"; Proceedings of the 2005 IEEE 9th International Conference on Rehabilitation Roboticss; 2005; pp. 241-246; Chicago PT LLC, Evanston, IL; USA.

Roman Kamnik et al.; "Rehabilitation Robot Cell for Multimodal Standing-Up Motion Augmentation"; article; Apr. 2005; pp. 2289-2294; Proceedings of the 2005 IEEE International Conference on Robotics and Automation; Barcelona, Spain; Spain.

T. Bajd et al.; "Standing-Up of a Healthy Subject and a Paraplegic Patient"; article; 1982; pp. 1-10; vol. 15, No. 1; J. Biomechanics, Great Britain.

N de N Donaldson et al.; "FES Standing: Control by Handle Reactions of Leg Muscle Stimulation" (CHRELMS); Dec. 1996; pp. 280-284; vol. 4, No. 4; IEEE Transactions on Rehabilitation Engineering; New York, NY; USA.

U.S. Appl. No. 11/409,163 of Sunil K. Agrawal et al. filed Apr. 21, 2006.

* cited by examiner

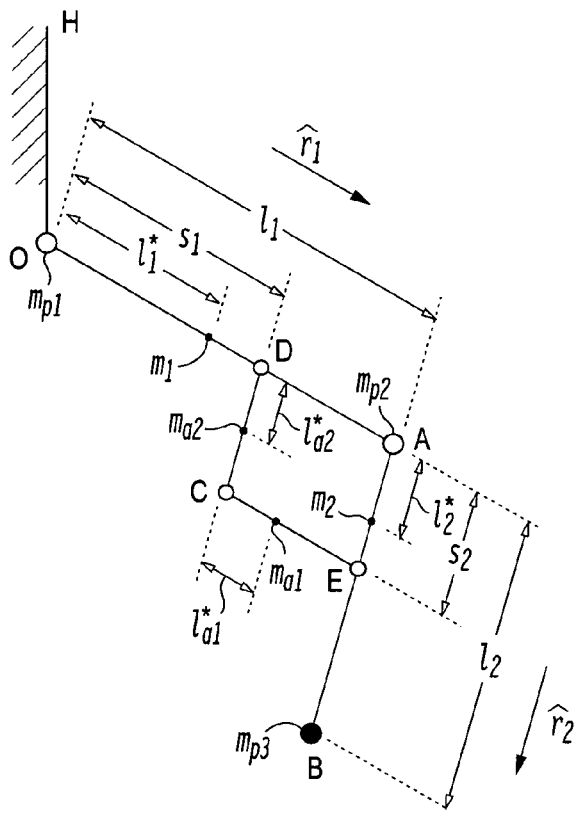 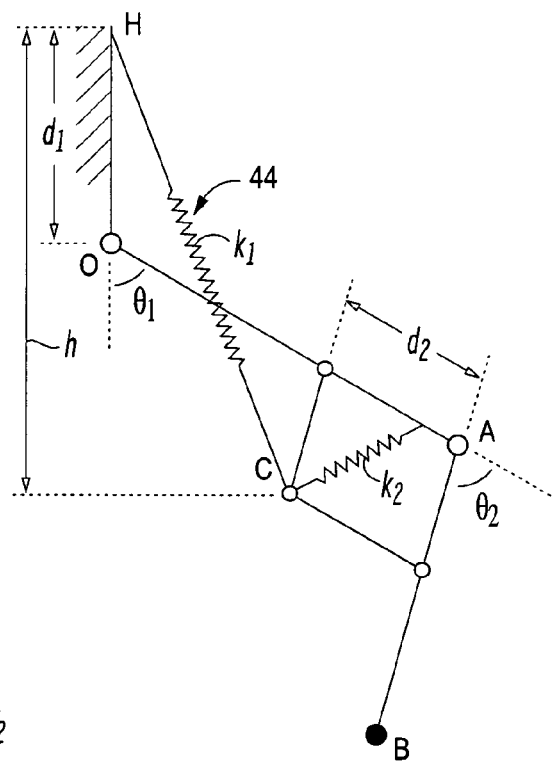
FIG. 2A  FIG. 2B
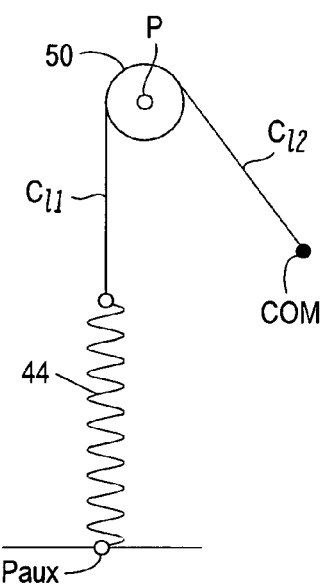 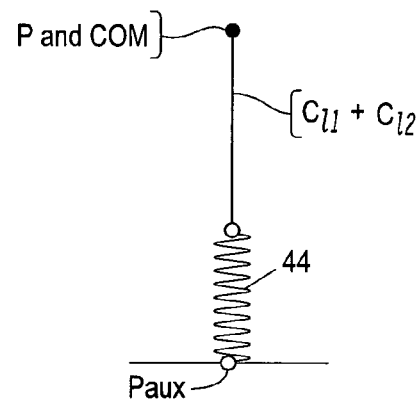
FIG. 3A  FIG. 3B

GRAVITY BALANCED ORTHOSIS APPARATUS

STATEMENT REGARDING FEDERALLY SPONSORED RESEARCH

The work leading to this invention was financed in part by the National Institute of Health (NIH) under a grant or contract No. 1 RO1 HD38582-01A2.

BACKGROUND OF THE INVENTION

This invention relates to a method and associated apparatus for transferring the weight of a plurality of weight bearing articulated members from a first supporting point to a second supporting point and more particularly to a method and passive orthosis apparatus for rehabilitating patients suffering from muscle weakness.

A vast number of people are affected by conditions that result in profound muscle weakness or impaired motor control. People with severe muscle weakness from neurological injury, such as hemiparesis from stroke, often have substantial movement limitations. One of the aims of rehabilitation after stroke is to improve the walking function. However, equipment available to facilitate this is severely limited.

Several lower extremity rehabilitation machines have been developed recently to help retrain gait during walking. Lokomat® is an actively powered exoskeleton, designed for patients with spinal cord injury. The patients use this machine while walking on a treadmill. Mechanized Gait Trainer® (MGT) is a single degree of freedom powered machine that drives the leg to move in a prescribed gait pattern. The machine consists of a foot plate connected to a crank and rocker system. The device simulates the phases of gait, supports the subjects according to their abilities, and controls the center of mass in the vertical and horizontal directions.

Auto-Ambulator® is a rehabilitation machine for assisting individuals, with stroke and spinal cord injuries, in leg motion impairments. This machine is designed to replicate the pattern of normal gait.

A limiting feature of these machines is that they move patients through predetermined movement patterns rather than allowing them to move under their own control. The failure to allow patients to experience and practice appropriate movement prevents necessary changes in the nervous system to promote relearning of typical patterns.

There is, therefore, still a need for a rehabilitation device that simulates the phases of gait, provides passive assistance, support a patient according to his/her abilities and allows the patient to move using muscle power.

SUMMARY OF THE INVENTION

There is provided according to this invention a method and associated equipment that allows patients to use their impaired muscles to move their limbs under their own power by balancing the effects of gravity on the afflicted limbs thereby reducing the effort needed to use such limb(s). Such balancing is achieved by transferring the weight of the afflicted limbs to a support external to the limbs, such as, for example a harness worn by the patient or a supporting structure forming part of a complete training system.

In its broader aspects the invention is a method for transferring the weight of articulated members of a system comprising a first supporting structure, and at least two interconnected articulated members pivotally attached to the support from the pivoting point to a new point on the supporting structure. According to the present invention, such method comprises:

(1) identifying a center of mass for each of the articulated members, together with any weight that may be supported by such articulated members;
(2) identifying a system center of mass representing the combined center of mass for all the articulated members;
(3) calculating a scale length for each of the articulated members and a parallelogram arm attachment point at one end of said scale length; and
(4) connecting the system center of mass:
to the parallelogram arm attachment point on each of the articulated members with an articulated lever structure forming a parallelogram;
(i) to the external support with a primary connecting structure comprising at least one spring; and
(iii) to at least one of the articulated members with a secondary connecting structure also comprising at least one spring.

In accordance with the present invention there is also provided an apparatus for transferring the weight of at least two interconnected articulated members from a first support to which they are pivotally attached to a second support. In addition to the interconnected articulated members, the apparatus further comprises:

a parallelogram lever structure comprising articulated lever arms connecting the system center of mass to the articulated members at the end of a scale length measured from the point of attachment of the articulated arm;

a primary connecting structure comprising at least one spring connecting the system center of mass to the second support; and at least one secondary connecting structure also comprising at least one spring, connecting the system center of mass to at least one of the articulated members.

In a preferred embodiment, at least one spring in the primary connecting structure is a zero free length spring.

Still according to this invention, the articulated members are designed to attach to and support the weight of human limbs such as a leg. In addition, both the pivotal attachment and the second support are located on a harness adapted to be worn by a human and the articulated members form an exoskeleton adapted for attachment to a human limb.

Alternatively, the second attachment point may be on a fixed structure external to the harness supporting the articulated members, and the fixed structure may incorporate a treadmill or a chair.

BRIEF DESCRIPTION OF THE DRAWINGS

FIGS. 2(a) and 2(b) show the significant elements and dimensions used in calculating the parallelogram design and spring attachment points for the apparatus of FIG. 1 in accordance with this invention.

FIGS. 3a and 3b are a schematic representation of a simple practical implementation of a zero free length spring in accordance with this invention.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention. The figures and drawings are not to scale and only include those elements that are necessary in describing and explaining the invention. Such figures are not intended to replace complete engineering drawings.

The principle involved in removing the weight of the leg, for example, is to support the weight of the leg using articulated members attached to the thigh and calf and place springs at suitable mathematically calculated positions on the articulated members such that they completely balance the effect of gravity, of both the leg and members. The weight of the leg is then transferred to a support which may be a harness worn by the patient or an external structure such as a fixed support (i.e. a wall) or which may be a part of a training device such as a treadmill.

Gravity balancing, according to this invention, is achieved by fixing a center of mass (COM) of the combined articulated equipment members and supported weight of the limb in space using a parallelogram mechanism and once so identified making the total potential energy for any configuration of the articulated members of the system constant using springs. The method used to make a gravity-balanced assistive device for the human body comprises the following steps:

(i) Determining the combined COM of the articulated supporting members and attached parts of the human body using auxiliary parallelograms; and
(ii) Selecting springs to connect to the COM such that the total potential energy of the system is invariant with configuration.

The invention will next be described with reference to certain specific embodiments such as an apparatus having two degrees of freedom, and one having more than two, specifically three. The examples given are illustrative and are used herein for the purpose of explaining rather than limiting this invention.

Example 1

Two Degrees of Freedom

The two degrees of freedom apparatus described is for use in full or partial support of a paretic limb i.e. a leg or a trunk, to help reduce the effect of gravity on the patient's motion. The present invention overcomes the problem of supporting the weight of the afflicted member during a dynamic activity like walking here the weight of the leg continuously shifts by balancing the weight of the leg in all configurations, thereby putting the leg in, so to speak, a state of neutral equilibrium.

Figure 1:
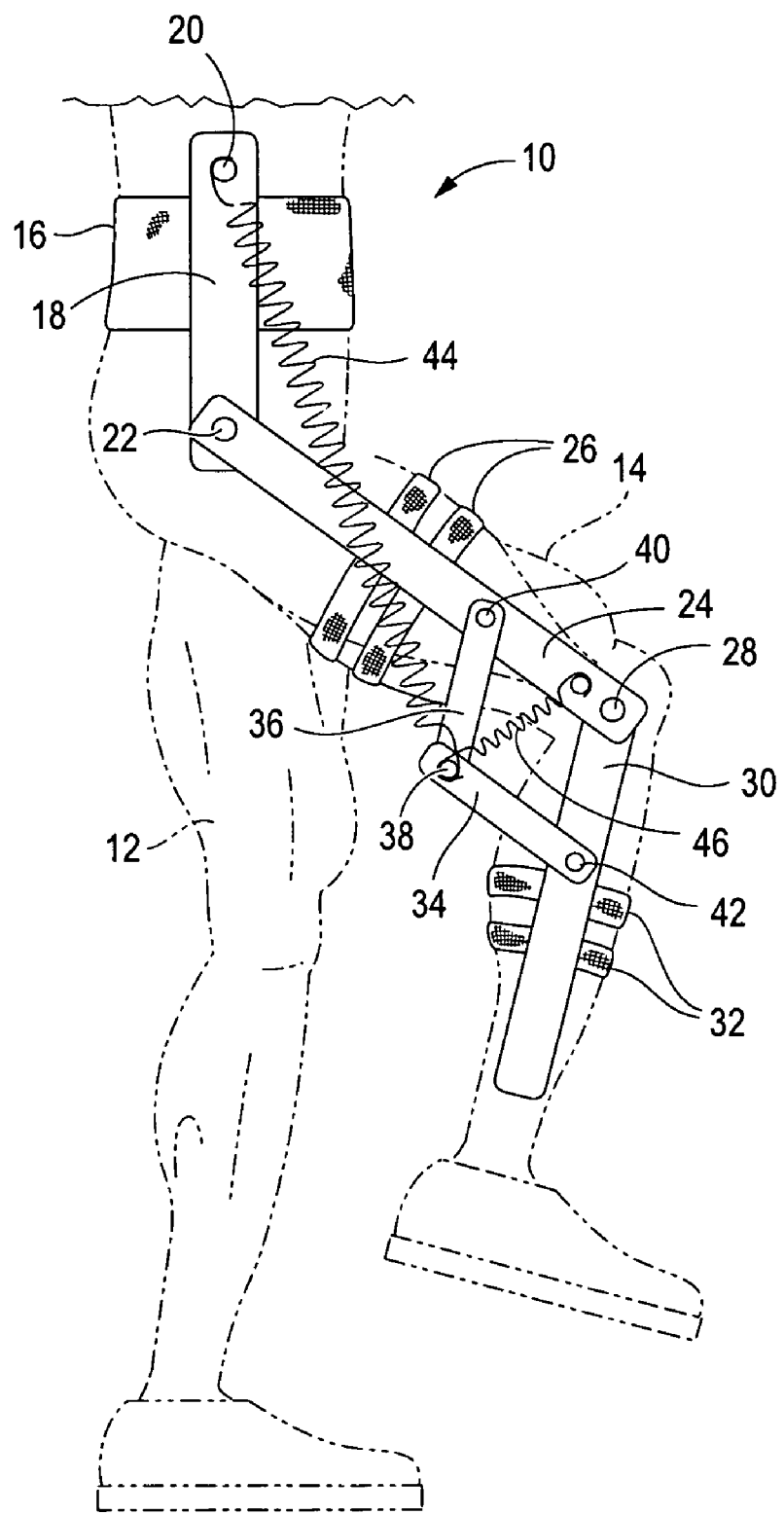
FIG. 1 is a schematic representation of an apparatus mounted on a patient for supporting a patient's leg according to present invention.

We will use FIGS. 1, 2a and 2b to demonstrate the calculation of the COM and the parallelogram structure as well as the selection of springs and their points of attachment for a system comprising two articulated members. The described system provides the design for an exoskeleton device for attachment to a patient's leg to assist such patient in walking.

Referring to FIG. 1 there is schematically illustrated a basic system according to the present invention designed for use to assist leg movement of an afflicted patient during a walking cycle. The patient 10, represented in the figure only partially, is in the process of lifting leg 14 while taking a stride. Leg 12 is on the ground. A harness 16 is strapped to the patients torso. Attached to the harness is a structure 18 that includes a primary support point 20. Also attached and supported by the harness is a two member leg support system comprising articulated members 24 and 30, pivotally connected to each other at articulation 28. The two members are attached to the thigh and the calf portions of leg 14 respectively with a harness 26 and 32 (or any other attachment method) in a way that movement of the leg and articulated members is in unison. The members and attachments are strong enough to support the full weight of the leg and articulated members.

Preferably, the members are constructed of lightweight material such as aluminum, and their length is adjustable to fit patient's having different length limbs.

A parallelogram formed by the members and arms 34 and 36 connects the COM 38 to points 40 and 42 on the articulated members 24 and 30. A primary spring connection 44 connects the COM to the primary support 20 on the harness 16. A secondary spring connection 46 connects the COM to either or both members 24 and 30. The two spring loaded mechanisms serve to transfer the weight of the leg from pivot points 28 and 22 to support 20.

In FIGS. 2(*a*) and (*b*), line OH represents the harness, or any external structure on which the primary support point H is located. Link OA represents the length of articulated member 24 with O corresponding to the pivotal attachment 22 and A to the pivotal attachment 28. Link AB represents the member 30, where B is an end point to which is also transferred the weight of the foot of the patient. The joints or pivots usually contain bearings or similar heavy objects, which are approximated as point masses $m_{p1}$, $m_{p2}$, and $m_{p3}$. $m_{p3}$ includes the weight of the foot.

Let:

$l_i$=length of the $i^{th}$ link;

$l^*_i$=distance of COM of the $i^{th}$ primary link from the joint of the previous link;

$l^*_{ai}$=distance of COM of the $i^{th}$ auxiliary link from the joint of the previous link;

$m_i$=mass of the ith primary link (mass of the leg segments included), $m_{ai}$=mass of the ith auxiliary link, $m_{pi}$=mass of the ith point mass, $\hat{u}_i$=unit vector along the ith primary link, $u_i$=position vector from the point O to the center of mass of ith primary link, $u_{ai}$=position vector from the point O to the center of mass of ith auxiliary link, $u_{pi}$=position vector from the point O to the center of mass of ith point mass, $s_1$=distance OD, $s_2$=distance AE $s_1$ and $s_2$ determine the two legs of the parallelogram that identifies the COM. We will refer to $s_1$ and $s_2$ as the scale length. The scale length further identifies the point of connection of the parallelogram arms to the articulated members.

In the preferred case where the links are made with an adjustable length, such as for example by using aluminum telescopic members, their mass remains constant, independent of their length. $l^*_{ai}$ is then a linear function of the length of the $i^{th}$ auxiliary link.

Let:

$$l^*_1 = \alpha_1 l_1$$

$$l^*_2 = \alpha_2 l_2$$

$$l^*_{a1} = \beta_1(l_1 - s_1)$$

$$l^*_{a2} = \beta_2 s_2$$

Where $\alpha_i$ and $\beta_i$ are the ratios between 0 and 1. The COM is given by:

$$R_{com} = \Sigma m_i u_i / \Sigma m_I$$

Where:

$$\Sigma m_i u_I = m_1 u_1 + m_2 u_2 + m_{a1} u_{a1} + m_{a2} u_{a2} + m_{p1} u_{p1} + m_{p2} u_{p2} + m_{p3} u_{p3}$$

$$\Sigma m_i = m_1 + m_2 + m_{a1} + m_{a2} + m_{p1} + m_{p2} + m_{p3}$$

Rewriting the vectors $u_i$ in terms of unit vectors along the primary links $\hat{u}_i$ as follows:

$$u_1 = l^*_1 \hat{u}_1;$$

$$u_2 = l_1 \hat{u}_1 + l^*_2 \hat{u}_2;$$

$$u_{a1} = s_1 \hat{u}_1 + s_2 \hat{u}_2 + l^*_{a1} \hat{u}_1;$$

$$u_{a2} = s_1 \hat{u}_1 + l^*_{a2} \hat{u}_2;$$

$$u_{p1} = 0$$

$$u_{p2} = l_1 \hat{u}_1;$$

$$u_{p3} = l_1 \hat{u}_1 + l_2 \hat{u}_2;$$

Since point C is the center of mass of the entire system, $u_{com} = s_1 \hat{u}_1 + s_2 \hat{u}_2$ and therefore:

$$s_1 = l_1(m_{a1} + m_2 + m_{p3} + m_{a1}\beta_1 + m_{p2})/(m_1 + m_2 + m_{p1} + m_{p2} + m_{p3} + m_{a1}\beta_1) \text{ and}$$

$$s_2 = l_2(m_2\alpha_2 + m_{p3})/(m_1 + m_2 + m_{a2} + m_{p1} + m_{p2} + mp3 - m_{a2}\beta_2)$$

Having thus obtained the COM the remaining step needed to obtain gravity balancing is to determine the springs. Balancing is achieved using springs as shown in FIG. 2b. Two springs are used in this example. One end of both the springs is connected to the center of mass of the system (COM in FIG. 2b). The other end of spring 44 is connected to the primary support 20 on the harness 16, point H in FIG. 2. The second spring 46 is also connected between the COM and member 24 of the articulated members which in the above example is connected to the thigh.

Let $x_1$ and $x_2$ be the extended lengths of the springs with corresponding stiffness $k_1$ and $k_2$ respectively. The springs are attached to the COM making the potential energy V constant for all configurations of the articulated members. That means:

$$V = (k_1 x_1^2/2) + (k_2 x_2^2/2) + Mgh.$$

$$x_1^2 = \|CH\|^2 = (d_1 + s_1 \cos\theta_1 + s_2 \cos(\theta_1 - \theta_2))^2 + (s_1 \sin\theta + s_2 \sin(\theta_1 - \theta_2))^2$$

$$x_2^2 = \|CS\|^2 = d_2^2 + s_2^2 - 2d_2 s_2 \cos\theta_2 \text{ and}$$

$$h = d_1 + s_1 \cos\theta_1 + s_2 \cos(\theta_1 - \theta_2)$$

Substituting and simplifying yields $V = C_0 + C_1 \cos\theta_1 + C_2 \cos\theta_2 + C_3 \cos(\theta_1 - \theta_2)$, Where:

$$C_0 = (k_1 d_1^2/2) + (k_2 d_2^2/2) + (k_1 s_1^2/2) + (k_1 s_2^2/2) + (k_2 s_2^2/2) - Mgd$$

$$C_1 = k_1 s_1 d_1 - Mgd$$

$$C_2 = k_1 s_1 s_2 - k_2 d_2 s_2$$

$$C_3 = k_1 s_2 d_1 - Mgs_2.$$

All the $C_i$ are constants if the coefficients containing trigonometric variables vanish, i.e. $C_1 = C_2 = C_3 = 0$, in which case the total potential energy is given by $V = C_0$ which is a constant. The potential energy thus becomes configuration invariant and gravity balancing is achieved. These conditions yield two independent equations:

$$k_1 = Mg/d_1 \text{ and } k_2 = Mgs_1/d_1 d_2$$

and thus provide the spring constant characteristic.

Preferably, the springs used are zero free length springs, which means that the tension in the spring is proportional to the distance between the two connection points. If the distance between the two connection points is zero, the tension in the spring is also zero.

Figure 7:
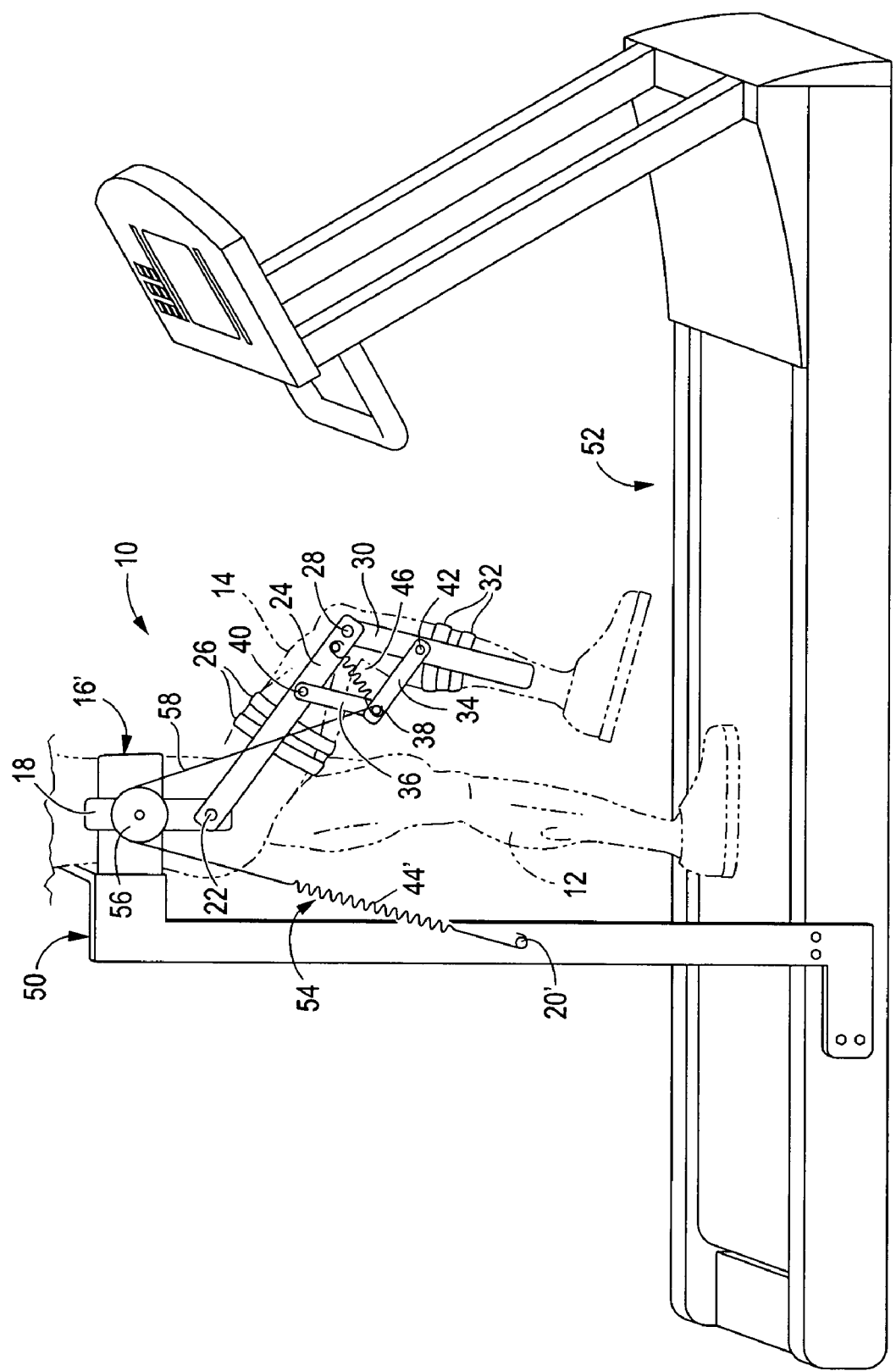
FIG. 7 shows the apparatus of FIG. 1 forming part of a larger system comprising a treadmill.

Implementation of a zero free length springs was done using springs, cable and pulleys as illustrated in FIGS. 3a and 3b. To emulate the property that the distance between the connection points is zero when the force (or tension) in the spring is zero, a pulley 50 is placed at the primary support P. A length of cable $C_{/1} + C_{/2}$ is connected to the COM, over the pulley 50 to one end of spring 44. The other end of spring 44 is attached to an auxiliary support point Paux preferably on the same base on which is attached the primary support P. In the case of the primary support being on a harness worn by the patient, i.e. harness 16 in FIG. 1, Paux is also on harness 16. However as shown in FIG. 7, where the primary support is on a structure separate from the exoskeleton, the spring is also attached to this structure. The length of the cable is chosen such that the force (or tension) in the cable (and hence the force in the simulated zero free length spring) is zero when the distance between the system center of mass COM and the pulley on the primary support point P is zero.

Example 2

Three Degrees of Freedom

More than two articulated members are also within the scope of this invention. The calculation of the COM and the selection of spring constants will next be illustrated in connection with the design of a 3 degree of freedom system for supporting and training device impaired subjects in sitting and getting up from a chair, with reference to FIGS. 4, 5 and 6.

The term three degrees-of-freedom is used to refer to the motion of the body at the hip, knee, and ankle. In the present design, the device is an orthosis device with straps or other convenient attachments between the corresponding moving segments of the machine and the patient's leg. In this example, the following assumptions are made:
(i) the motion of the body is in sagittal plane;
(ii) both legs have the same motion during the sit to stand cycle (STS) motion; and
(iii) the device links are lightweight and do not add significant mass to the moving.

Figure 4:
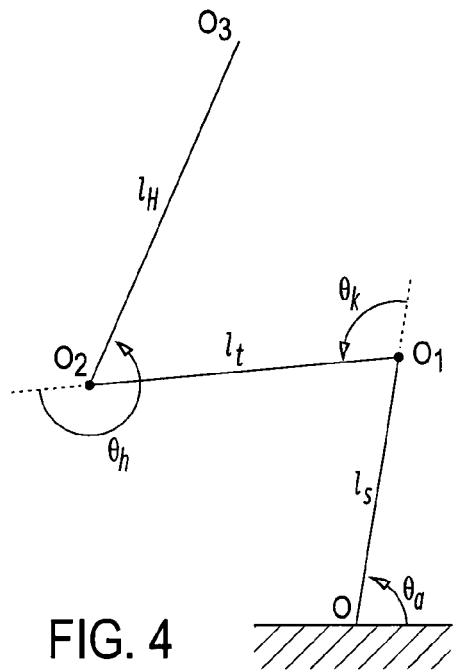
FIGS. 4, 5 and 6 are a representation of the significant elements and dimensions used in calculating the parallelogram design and spring attachment points for an apparatus having three degrees of freedom such as would be used to assist a patient in sitting up and down.

The human body can be modeled during sit to stand (STS) motion as having 3 degrees-of-freedom (DOF), as shown in FIG. 4. The sagittal plane approximation holds if both legs do not have any out-of-plane motion. Links $l_s(0 0_1)$, $l_t(0_1 0_2)$, and $l_H(0_2 0_3)$ represent the shank, thigh and HAT (Head, Arm and Trunk) segments of the human body, respectively. The head, arm and trunk of the body is considered as a "HAT" single body whose center of mass remains fixed during the sit to stand motion. The angles $\theta_a$, $\theta_k$ and $\theta_h$ are the ankle, knee and hip joint angles, respectively.

Figure 5:
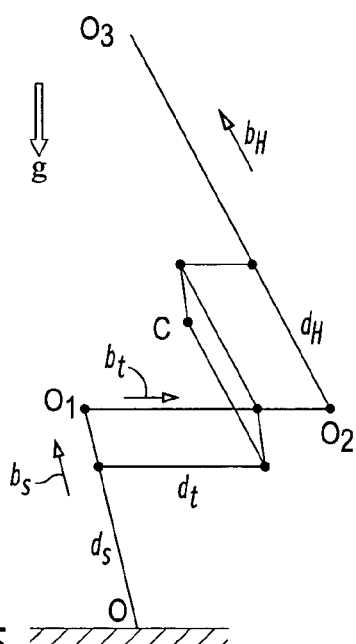

To form the parallelograms one again needs to find the scaled lengths in each of the articulated members. Scaled lengths $d_j$ are factors of geometry and mass distribution. The three scaled lengths used to form two parallelograms and to identify location of the COM C ($r_{OC} = d_s b_s + d_t b_t + d_H b_H$) are shown in FIG. 5, where:

$$d_s = (1/M)(m_t l_s + m_H l_s + m_s l_{cs})$$

$$d_t = (1/M)(m_H l_t + m_t l_{ct})$$

$$d_H = (1/M) m_H l_{cH}$$

and where:

$$M = m_s + m_t + m_H.$$

$m_j$=mass of a length j of the combined supporting member and attached weight;

$l_j$=length of supporting member j; and $l_{cj}$=is the distance to a supporting member j center of mass.

Figure 6:
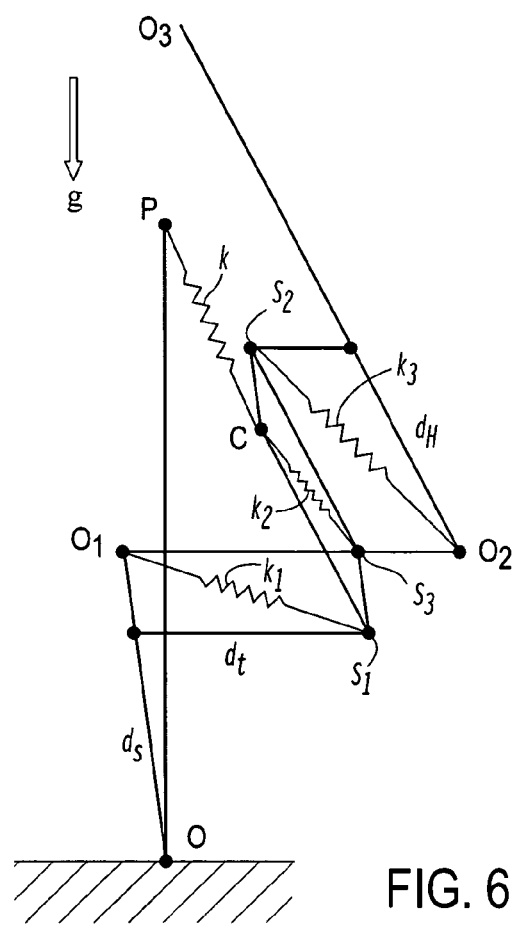

Having determined the COM of the system, the spring constants are next determined. The human body and the device is next gravity-balanced by attaching four springs to the system as shown in FIG. 6. The total potential energy of the system consists of gravitational ($V_g$) and elastic ($V_s$) energies due to the springs. Its expression is given by:

$$V = V_s + V_g = (\tfrac{1}{2})kx^2 + (\tfrac{1}{2})k_1 x_1^2 + (\tfrac{1}{2})k_2 x_2^2 + (\tfrac{1}{2})k_3 x_3^2 - Mg \cdot r_{oc}$$

upon substitution of $$x^2 = \|PC\| \cdot \|PC\|,$$

$$x_1^2 = \|O_1 S_1\| \cdot \|O_1 S_1\|,$$

$$x_2^2 = \|CS_3\| \cdot \|CS_3\| \text{ and}$$

$$x_3^2 = \|O_2 S_2\| \cdot \|O_2 S_2\|$$

and expanding the results thus obtained in terms of joint angles, one obtains:

$$Mg \cdot r_{oc} = Mg(d_s s_a + d_t s_{ak} + d_H s_{akh})$$

$$x^2 = (d_s c_a + d_t c_{ak} + d_H c_{akh})^2 + (d_s s_a + d_t s_{ak} + d_H s_{akh} - d)^2$$

$$x_1^2 = d_t + (l_s - d_s)^2 - 2(l_s - d_s) d_t c_k$$

$$x_2^2 = d_H^2 + (l_s - d_s)^2 - 2 d_H (l_s - d_s) c_{kh}$$

$$x_3^2 = (l_t - d_t)^2 + d_H^2 - 2 d_H (l_t - d_t) c_h.$$

Here, $c_i$, $s_i$, $c_{ij}$, $S_{ij}$, $c_{ijk}$ and $s_{ijk}$ stand for $\cos\theta_i$, $\sin\theta_i$, $\cos(\theta_i+\theta_j)$, $\sin(\theta_i+\theta_j)$, $\cos(\theta_i+\theta_j+\theta_k)$ and $\sin(\theta_i+\theta_j+\theta_k)$, respectively. Also $d = \|OP\|$ is the distance along the gravity as shown in FIG. 6, and x and $x_i$ are deformation and k and $k_i$ where i=1, 2, 3 are stiffness of the springs. In this above analysis, it is assumed that the undeformed length of the spring is zero.

Setting next the coefficients of the configuration variables in the potential energy to zero, the desired stiffness of the springs for gravity balancing of the system are derived as:

$$k = Mg/d$$

$$k_1 = kd_s/(l_s - d_s)$$

$$k_2 = kd_s/(l_s - d_s)$$

$$k_3 = kd_t/(l_t - d_t).$$

Again in the preferred physical implementation a zero free length spring is used behind a pulley as previously explained, where the spring force can be transmitted through a cable.

Examples 1 and 2 illustrate the invention and explain the different calculations needed in order to practice the invention in two specific applications. Example 1 shows the invention as an exoskeleton worn by a patient, while example 2 discusses in general terms an arrangement for assisting a patient in sitting down and getting up.

The devices shown may be part of another device. For example, as shown in FIG. 7, the primary weight support point 20' be supported by a fixed support 50 external to the harness 16' worn by the patient so that the patient does not bear any of the leg weight using a zero length spring 54 comprising a pulley 56, a cable 58 and a spring 44'. As also shown in FIG. 7 this external primary support point 20' may be part of a training device such as, for example, a treadmill 52.

Figure 8:
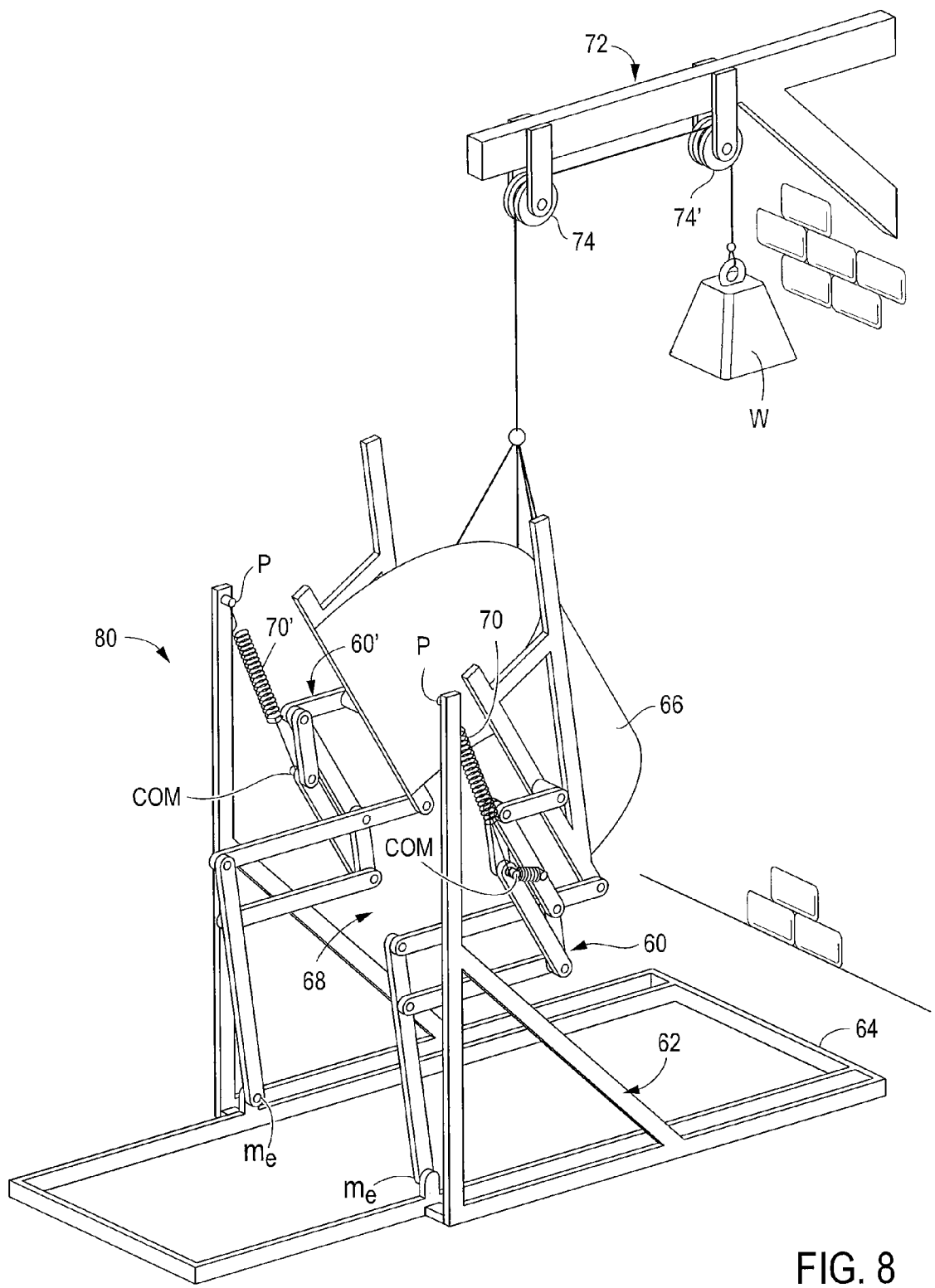
FIG. 8 is a schematic representation of a three degree of freedom apparatus implemented in a system used to assist a patient in sitting up and down.

FIG. 8 shows in very schematic representation a chair (80) with a device according to example 2 of this invention attached. The chair and invention have been greatly simplified and most springs omitted to avoid over cluttering of the figure. The chair comprises a sitting part 68 and a back harness 66. The system comprises two sets of articulated members one on the left side and one on the right. To avoid undue cluttering of the figure, only the primary springs 70 and 70' connecting the COM springs to the frame at the primary support point P are shown. Also shown are the two sets of two parallelograms 60 and 60' used on the left and right sides. The auxiliary springs connecting the COM to the articulated members have been omitted for clarity; their location and points of attachment are as illustrated in FIG. 6. A patient, also not shown to avoid undue cluttering, is strapped to the device and may practice sitting up and down a number of times as part of re-training of the failing muscles with his weight having been taken over the primary support.

Since the springs compensate for the weight of whole body and have large extensions, the resulting calculated stiffness of the springs is high and it is hard to select springs with large extensions and high stiffness. Additionally, the size of the auxiliary parallelograms is sometimes small and it is difficult to physically fabricate them.

To alleviate these problems, it is preferred to modify the design to have smaller stiffness of the springs and larger size for auxiliary linkages by: (a) Using an added ankle weight $m_e$ leading to larger size for the parallelograms; (b) Using a body weight support (harness) to partially reduce the weight of the body as shown in FIG. 8 where the harness is also supported by a counterweight W on a cable and pulley system 74 and 74' supported on a beam 78; and (c) altering the location of the center of mass to reduce the stiffness of the springs.

While preferred embodiments of the invention have been shown and described herein, it will be understood that such embodiments are provided by way of example only. These examples are not limiting the method and apparatus to the two specific embodiments shown and described but the method and principles taught herein may also be applied to an arm assisting device and more broadly to robotic devices involving articulated members motion as well as other variations, changes and substitutions that will occur to those skilled in the art without departing from the spirit of the invention. Accordingly, it is intended that the appended claims cover all such variations as fall within the spirit and scope of the invention.

What is claimed:

1. Apparatus for transferring a weight of an articulated system comprising a plurality of pivotally connected members from a first support to which said pivotally connected members are directly attached to a primary support, the apparatus comprising:
    (1) a parallelogram arm structure connecting a scale length on each of said plurality of pivotally connected members to a combined center of mass of said plurality of pivotally connected members;
    (2) a first connecting spring connecting said center of mass to said primary support, and
    (3) a second connecting spring connecting said center of mass to said plurality of pivotally connected members,
    wherein said first and second springs are selected such that the total potential energy of the articulated system is invariant with member configuration.

2. Apparatus according to claim 1 wherein said articulated system pivotally connected members are each adapted to attach to and support an external weight and wherein the scaled length of each member is calculated to include the attached weight.

3. The apparatus according to claim 2 wherein both the first support and the primary support are located on a harness adapted to be worn by a human and the articulated system forms an exoskeleton adapted for attachment to at least one human limb.

4. The apparatus according to claim 3 wherein the human limb is one of a human leg or a human arm.

5. The apparatus according to claim 4 wherein the primary support is located on a fixed structure external to the harness.

6. The apparatus according to claim 5 wherein the fixed structure further includes a treadmill.

7. The apparatus according to claim 1 wherein the articulated system comprises three degrees of freedom and is adapted for mounting on a person forming an exoskeleton having pivoting members attached to a person's torso, thigh, and calf and wherein said first supporting point is said person's ankle and said primary point is located external to said exoskeleton.

8. The apparatus according to claim 7 further comprising a counterweight attached to said exoskeleton.

9. The apparatus according to claim 1 wherein said members have a length and said length is adjustable.

10. A method for using the apparatus of claim 1 for transferring the weight of the system comprising the plurality of articulated members from the first support to the primary support, the method comprising:
    (i) determining the combined center of mass of the plurality of articulated supporting members for any member configuration and any attached weight using auxiliary scaled length parallelograms; and
    (ii) selecting the springs to connect the combined center of mass to said primary support and to said plurality of articulated members such that the total potential energy of the system is invariant with member configuration.

11. The method according to claim 10 wherein at least one of said springs is a zero free length spring.

12. The method according to claim 10 further comprising attaching said articulated members to a person's body to form a passive exoskeleton supporting at least a part of said person's body.

13. The method according to claim 12 further comprising a harness supporting said exoskeleton on said person's body and wherein the method comprises placing said second support point on a structure external to both said harness and said exoskeleton.

14. A method for using the apparatus of claim 1 for transferring the weight from the first support to the primary support, said weight supported on a pivoting support and comprising weight of at least two interconnected articulated members pivotally attached to said pivoting support, the method comprising:
    I. identifying a center of mass for each of the articulated members, together with any additional weight supported by such articulated members;
    II. calculating a scale length for each of the articulated members;
    III. deriving a parallelogram comprising said scale length and identifying a system center of mass representing the combined center of mass for the articulated members regardless of an articulated members configuration on said parallelogram;
    IV. connecting said parallelogram to said at least two members;
    V. selecting springs to connect the combined center of mass to said primary supporting point and to said plurality of articulated members such that the total potential energy of the system is invariant with member configuration; and
    VI. connecting the system center of mass:
        (a) to the primary support with at least one of said selected springs; and
        (b) to the articulated members with at least another of said selected springs.

15. The method according to claim 14 wherein said articulated members support an attached weight and wherein the system center of mass includes the weight supported by each of said members respectively.

16. The method according to claim 15 wherein said selected at least one spring is a zero free length spring.

17. The method according to claim 14 further comprising the step of attaching said articulated members to a person.

18. The method according to claim 17 wherein said articulated members are attached to said person's leg.

* * * * *

UNITED STATES PATENT AND TRADEMARK OFFICE
CERTIFICATE OF CORRECTION

| | |
|---|---|
| PATENT NO. | : 7,544,155 B2 |
| APPLICATION NO. | : 11/113729 |
| DATED | : June 9, 2009 |
| INVENTOR(S) | : Sunil K. Agrawal et al. |

It is certified that error appears in the above-identified patent and that said Letters Patent is hereby corrected as shown below:

On the Title Page, FIELD (75), Inventors, Sal Banala, Newark, DE (US); should read --Sai Banala, Newark, DE (US)--

Signed and Sealed this

Twenty-second Day of September, 2009

David J. Kappos
*Director of the United States Patent and Trademark Office*